US 10,865,675 B2

(12) United States Patent
Furukawa et al.

(10) Patent No.: US 10,865,675 B2
(45) Date of Patent: Dec. 15, 2020

(54) PARTICULATE MATTER (PM) SENSOR FOR DETECTING QUANTITY OF PM IN EXHAUST GAS FROM E.G. DIESEL ENGINE

(71) Applicant: ISUZU MOTORS LIMITED, Tokyo (JP)

(72) Inventors: Takayuki Furukawa, Sagamihara (JP); Kenji Fujii, Yokohama (JP); Tadashi Uchiyama, Kamakura (JP); Kazuo Ohsumi, Fujisawa (JP); Keisuke Nakamura, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 165 days.

(21) Appl. No.: 16/093,666

(22) PCT Filed: Apr. 11, 2017

(86) PCT No.: PCT/JP2017/014814
§ 371 (c)(1),
(2) Date: Oct. 15, 2018

(87) PCT Pub. No.: WO2017/179572
PCT Pub. Date: Oct. 19, 2017

(65) Prior Publication Data
US 2019/0128159 A1 May 2, 2019

(30) Foreign Application Priority Data
Apr. 14, 2016 (JP) .................................. 2016-081541

(51) Int. Cl.
*G01N 15/06* (2006.01)
*G01N 15/00* (2006.01)
(Continued)

(52) U.S. Cl.
CPC ............... *F01N 3/022* (2013.01); *F01N 3/00* (2013.01); *F01N 3/023* (2013.01); *F01N 3/0222* (2013.01);
(Continued)

(58) Field of Classification Search
CPC ...... F01N 11/00; F01N 2560/05; F01N 9/002; F01N 13/008; F01N 2560/12;
(Continued)

(56) References Cited

U.S. PATENT DOCUMENTS

2006/0059901 A1* 3/2006 Saito ..................... F01N 9/002
60/297
2010/0242441 A1* 9/2010 Kondo .................. F01N 9/002
60/277
(Continued)

FOREIGN PATENT DOCUMENTS

EP 2174701 A1 4/2010
EP 2554236 A1 2/2013
(Continued)

OTHER PUBLICATIONS

International Search Report from International Application No. PCT/JP2017/014814 dated May 30, 2017.
(Continued)

*Primary Examiner* — Brandi N Hopkins
(74) *Attorney, Agent, or Firm* — Brundidge & Stanger, P.C.

(57) ABSTRACT

This particulate matter (PM) sensor is provided with a porous body that has a partition disposed in a passage for exhaust gas including particulate matter, at least a pair of electrodes that oppose each other in a prescribed direction so as to sandwich the porous body, and a deposition part that includes the surface of the partition on the upstream side of the passage, has the particulate matter deposited thereon, (Continued)

and has, formed therein, pores having an average pore diameter smaller than the average pore diameter of the portion of the partition other than the deposition part.

3 Claims, 7 Drawing Sheets

(51) Int. Cl.

| | | |
|---|---|---|
| F01N 3/022 | (2006.01) | |
| F01N 3/023 | (2006.01) | |
| F01N 9/00 | (2006.01) | |
| F01N 3/00 | (2006.01) | |
| G01N 27/22 | (2006.01) | |

(52) U.S. Cl.
CPC ......... F01N 9/002 (2013.01); G01N 15/0606 (2013.01); G01N 15/0656 (2013.01); G01N 27/22 (2013.01); F01N 2560/05 (2013.01); G01N 2015/0046 (2013.01)

(58) Field of Classification Search
CPC ....... G01N 15/0656; G01N 2015/0046; G01N 15/0618; G01N 15/0255; G01N 15/02; G01N 2001/2288; G01N 1/2252; G01N 1/2205; G01N 15/0272; Y02T 10/47; G01M 15/102

See application file for complete search history.

(56) References Cited

U.S. PATENT DOCUMENTS

| | | |
|---|---|---|
| 2015/0322832 A1 | 11/2015 | Itch et al. |
| 2016/0047731 A1* | 2/2016 | Noda ...................... F01N 11/00 73/23.33 |
| 2016/0047732 A1* | 2/2016 | Uchiyama ............... F01N 11/00 73/23.33 |
| 2017/0227423 A1 | 8/2017 | Uchiyama et al. |

FOREIGN PATENT DOCUMENTS

| | | |
|---|---|---|
| EP | 2926881 A1 | 10/2015 |
| JP | 61-019755 U | 2/1986 |
| JP | 06-033734 A | 2/1994 |
| JP | 2012-241643 A | 12/2012 |
| JP | 2016-008862 A | 1/2016 |
| JP | 2016-037950 A | 3/2016 |
| WO | 2011/125772 A1 | 10/2011 |

OTHER PUBLICATIONS

Extended European Search Report dated Dec. 19, 2018 for European Patent Application No. 17782385.3.

* cited by examiner

PARTICULATE MATTER (PM) SENSOR FOR DETECTING QUANTITY OF PM IN EXHAUST GAS FROM E.G. DIESEL ENGINE

TECHNICAL FIELD

The present disclosure relates to a PM sensor that can detect the amount of particulate matter contained in exhaust gas discharged from an internal combustion engine.

BACKGROUND ART

The exhaust gas of an internal combustion engine contains particulate matter (hereinafter referred to as "PM"). In order to remove PM, a PM filter is disposed in a passage of the exhaust gas (hereinafter referred to as "exhaust passage"). This PM filter is, for example, a diesel particulate filter (hereinafter referred to as "DPF").

The PM filter clogs when PM is continuously collected. Therefore, the PM accumulated in the PM filter is forcibly burned and removed. This process is known as a PM filter regeneration process.

The PM sensor is used to, for example, determine the amount of PM accumulated in the PM filter. The PM sensor is disposed downstream from the PM filter in the exhaust passage and is configured to take in part of the exhaust gas that has passed through the PM filter, subject it to predetermined treatment, and discharge it from the exhaust passage.

To achieve the predetermined treatment, the PM sensor includes a porous filter disposed in the passage of the intake exhaust gas. In this porous filter, PM contained in the exhaust gas and passing therethrough accumulates on the surface located upstream of the passage. The PM sensor further includes at least a pair of electrodes opposed to each other across the porous filter. The PM sensor derives the amount of PM accumulated in the porous filter according to the capacitance of a capacitor consisting of at least a pair of electrodes (see, for example, PTL 1).

CITATION LIST

Patent Literature

PTL 1
Japanese Patent Application Laid-Open No. 2012-241643

SUMMARY OF INVENTION

Technical Problem

However, in the conventional PM sensor, the size and/or distribution of the pores in the porous filter are not completely uniform. For this reason, PM accumulates in the porous filter unevenly. Since the PM in the porous filter does not affect the capacitance of a capacitor, the detection accuracy of the PM sensor may deteriorate if PM accumulates unevenly.

An object of the present disclosure is to provide a PM sensor in which a reduction in the detection accuracy can be suppressed.

Solution to Problem

The present disclosure is directed to a particulate matter (PM) sensor including:
a porous member including a partition wall disposed in a passage of exhaust gas containing particulate matter;
at least a pair of electrodes opposed to each other in a predetermined direction across the porous member; and
an accumulation section provided in a surface on a upstream side of the passage of the partition wall so that particulate matter accumulates on the surface, the accumulation section including pores with an average pore diameter smaller than an average pore diameter of a portion other than the accumulation section in the partition wall.

Advantageous Effects of Invention

The present disclosure can provide a PM sensor in which a reduction in the detection accuracy can be suppressed.

DESCRIPTION OF EMBODIMENTS

PM sensor 1A according to the present disclosure will now be described in detail with reference to the above drawings.

Note that some of the above drawings depict the L axis, W axis, and T axis. The L axis, the W axis, and the T axis indicate the length direction, width direction, and height direction, respectively, of the PM sensor 1A. These directions are orthogonal to each other. In the following description, the length direction, the width direction, and the height direction of the PM sensor 1A may be referred to as length direction L, width direction W, and height direction T, respectively. The positive side of length direction L is referred to as a front end side, and the negative side is referred to as a rear end side.

1. PERIPHERAL CONFIGURATION OF PM SENSOR 1A

Figure 1:
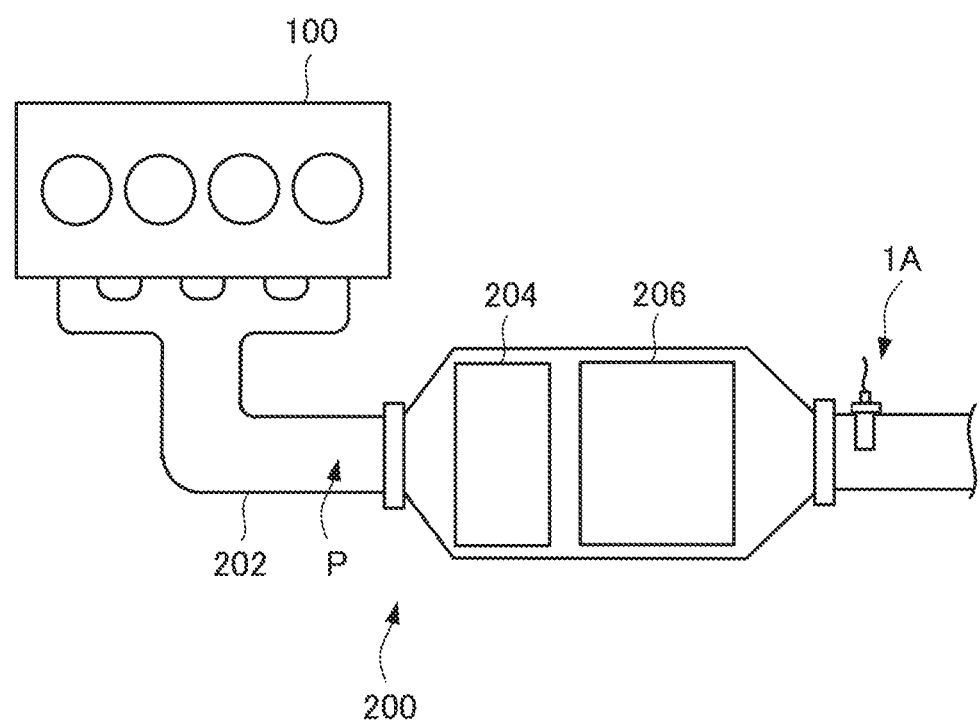
FIG. 1 is a schematic view illustrating an exhaust system to which a PM sensor according to the present disclosure is applied.

FIG. 1 shows internal combustion engine 100, exhaust system 200, and PM sensor 1A according to the present disclosure.

Internal combustion engine 100 is typically a diesel engine.

Exhaust system 200 roughly includes exhaust pipe 202 defining exhaust passage P, oxidation catalyst 204, and PM filter 206. Oxidation catalyst 204 is provided upstream from PM filter 206 in exhaust passage P. PM filter 206 is typically a diesel particulate filter.

PM sensor 1A is provided upstream from PM filter 206 in exhaust passage P. PM sensor 1A, which is typically used to derive the amount of PM accumulated in PM filter 206, takes in part of the exhaust gas that has passed through PM filter 206, subjects it to predetermined treatment, and discharges it from the exhaust passage.

Figure 2:
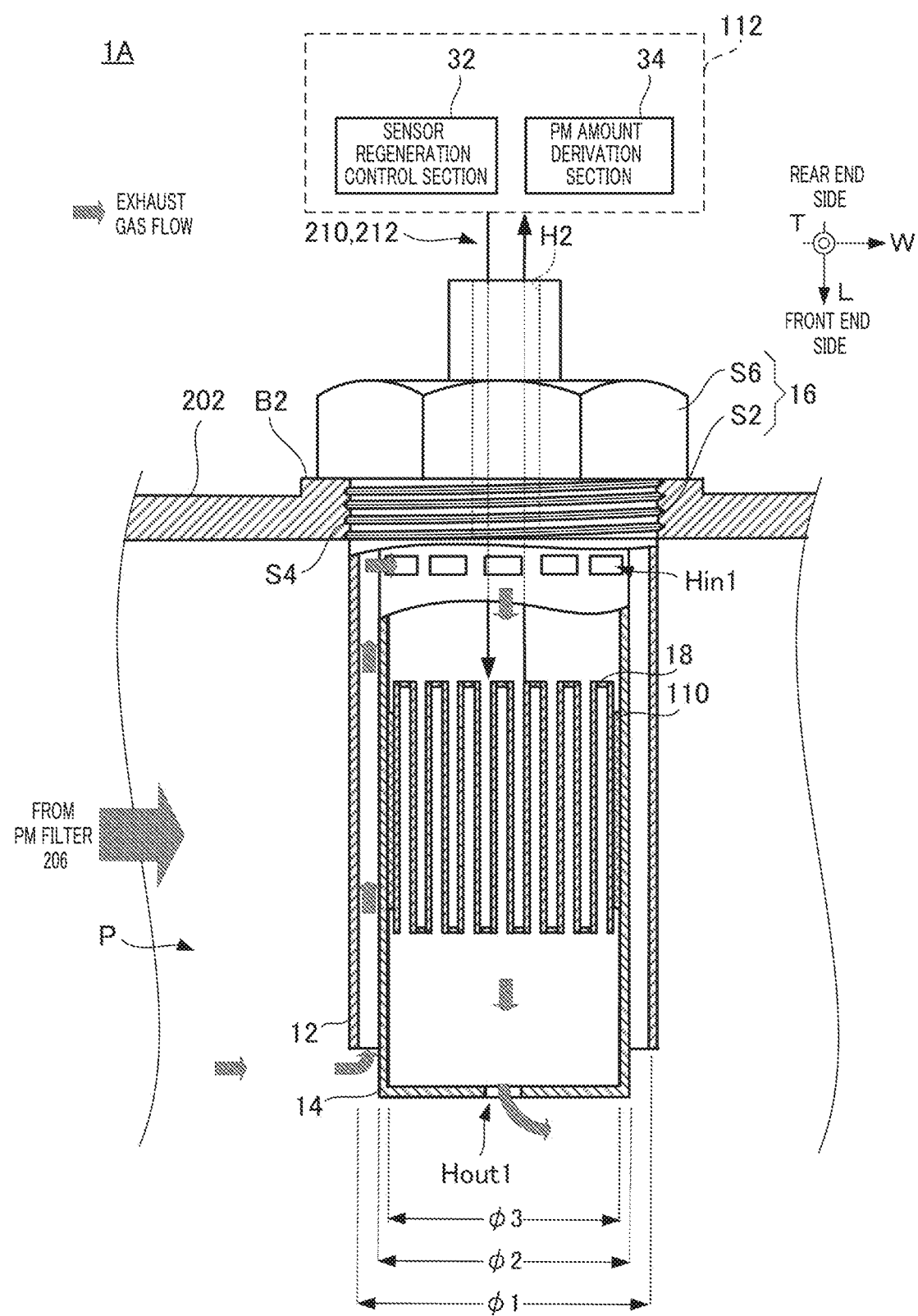
FIG. 2 is a partial cross-sectional view schematically showing a configuration example of the PM sensor shown in FIG. 1.

Hereinafter, PM sensor 1A of the present disclosure will now be described in detail with reference to FIGS. 2 to 3D.

2. DETAILED CONFIGURATION OF PM SENSOR 1A

PM sensor 1A includes outer case 12, inner case 14, attachment section 16, sensor section 18, support member 110, and control section 112. Here, regarding outer case 12 and inner case 14, FIG. 2 shows sectional shapes obtained by cutting a part of the cases along an imaginary plane parallel to the WL plane. Regarding sensor section 18 and support member 110, sectional shapes obtained by cutting them along the same imaginary plane are shown.

Outer case 12 has, for example, a cylindrical shape having a center axis parallel to length direction L. Opposite ends of outer case 12 in length direction L are not closed but have openings having a predetermined inner diameter $\phi 1$.

Inner case 14 has, for example, a bottomed cylindrical shape having a center axis parallel to length direction L. In the present disclosure, inner case 14 is longer in length direction L than outer case 12. Outer diameter $\phi 2$ of inner case 14 is smaller than inner diameter $\phi 1$ of outer case 12. Further, the rear end of inner case 14 is not closed but forms an opening having predetermined inner diameter $\phi 3$. Further, in the vicinity of the rear end of inner case 14, multiple inlets (through holes) Hin1 are formed along the circumferential direction of the outer surface of inner case 14. Note that in FIG. 2, for visibility in the drawing, only one inlet is given reference numeral Hin1. Further, the front end of inner case 14 is bottomed and is not completely but substantially closed. To be specific, at least one outlet (through hole) Hout1 having a smaller diameter than inner diameter $\phi 3$ is formed in the generally central portion of this bottom.

Attachment section 16 has a generally ring shape. Inner case 14 and outer case 12 are inserted and fixed to the front end side of attachment section 16. Both cases 12 and 14 are fixed to attachment section 16, so that (1) the center axes of the cases 12 and 14 are aligned, and (2) inner case 14 is contained in the internal space of outer case 12. Further, in the present disclosure, (3) the front end of inner case 14 protrudes further than front end of outer case 12.

Male screw S2 is formed on the outer surface of attachment section 16. Boss B2 is provided downstream from PM filter 206 in exhaust passage P, and a through hole, which passes through exhaust pipe 202 and has female screw S4 on the inner surface, is formed in boss B2. Male screw S2 can be mated with female screw S4. Nut section S6 is provided on the rear end side of male screw S2. PM sensor 1A is attached to exhaust pipe 202 through attachment section 16 described above and female screw S4 of exhaust pipe 202.

Further, attachment section 16 has through holes H2 which pass therethrough along length direction L and through which conductors 210 and 212 (see FIGS. 3A and 3B) drawn out from sensor section 18.

As shown in FIGS. 3A to 3D, sensor section 18 includes at least two electrodes 22 (in the drawing, five electrodes 22a to 22e) in pairs, at least a single layer of porous member 24 (in the drawing, four porous members 24a to 24d), and at least one heater 26 (in the drawing, two heaters 26a and 26b).

Each electrode 22 consists of a planar conductor and has, for example, a main surface that is substantially parallel to the LW plane and has a substantially rectangular shape. Electrodes 22 are aligned along a predetermined direction (for example, height direction T). Two electrodes 22 aligned adjacent to each other along a predetermined direction are opposed to each other across a predetermined distance, thereby forming a capacitor.

For example, each porous member 24 consists of a combination of multiple partition walls 25 (see, in particular, FIG. 3C) which are, for example, sheets of porous and insulating ceramics and, for example, each layer is inserted between electrodes 22 aligned adjacent to each other along a predetermined direction. Note that FIG. 3C shows only three partition walls 25 for convenience. To be specific, multiple partition walls 25, which are present between adjacent electrodes 22, are aligned across a predetermined gap in parallel with a predetermined direction (e.g., height direction T) and extend in length direction L. This forms first cuboid cavity C1 and second cuboid cavity C2 in which the space between adjacent electrodes 22 is partitioned by multiple partition walls 25 and which extend in length direction L and are aligned adjacent to each other, for example, along width direction W. Note that a similar ceramic sheet is interposed between each partition wall 25 and corresponding electrode 22.

In addition, when the front end of first cuboid cavity C1 forms an opening and the rear end is closed, the front end of second cuboid cavity C2 aligned adjacent thereto along width direction W is closed and the rear end is formed into an opening. Such a relationship applies to all combinations of cuboid cavities C1 and C2.

Figure 3A:
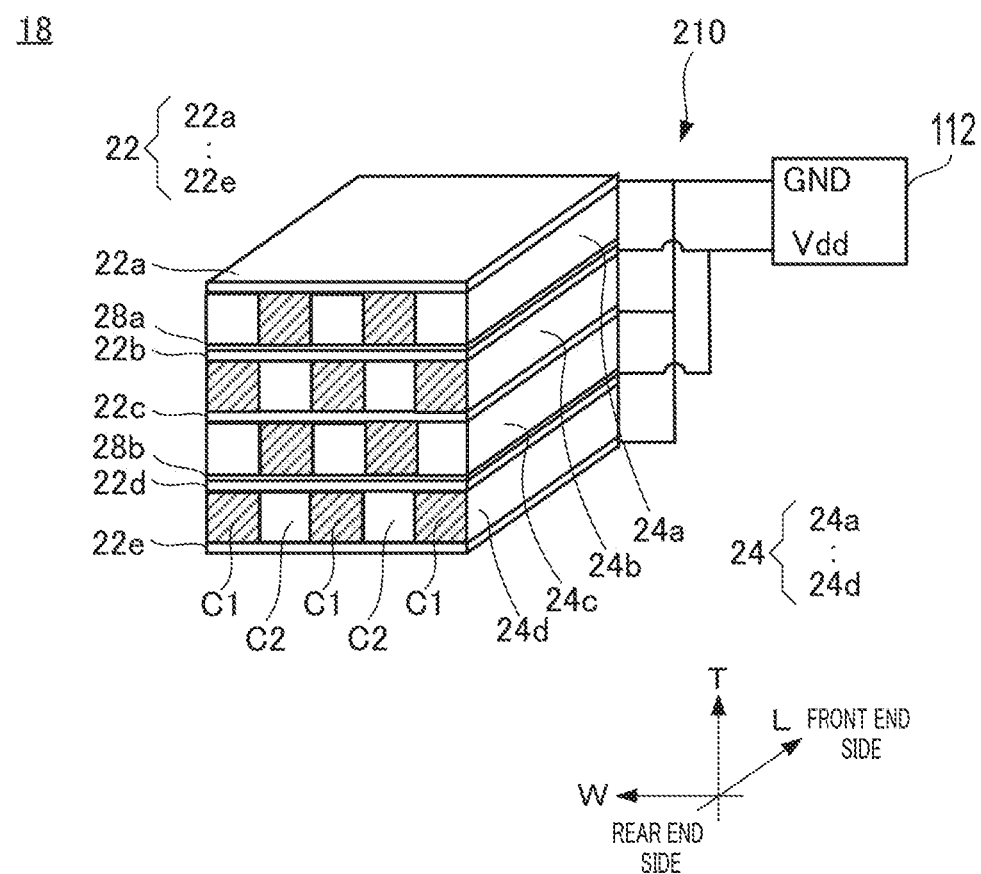
FIG. 3A is a perspective view schematically showing the configuration example of the sensor section shown in FIG. 2.
Figure 3B:
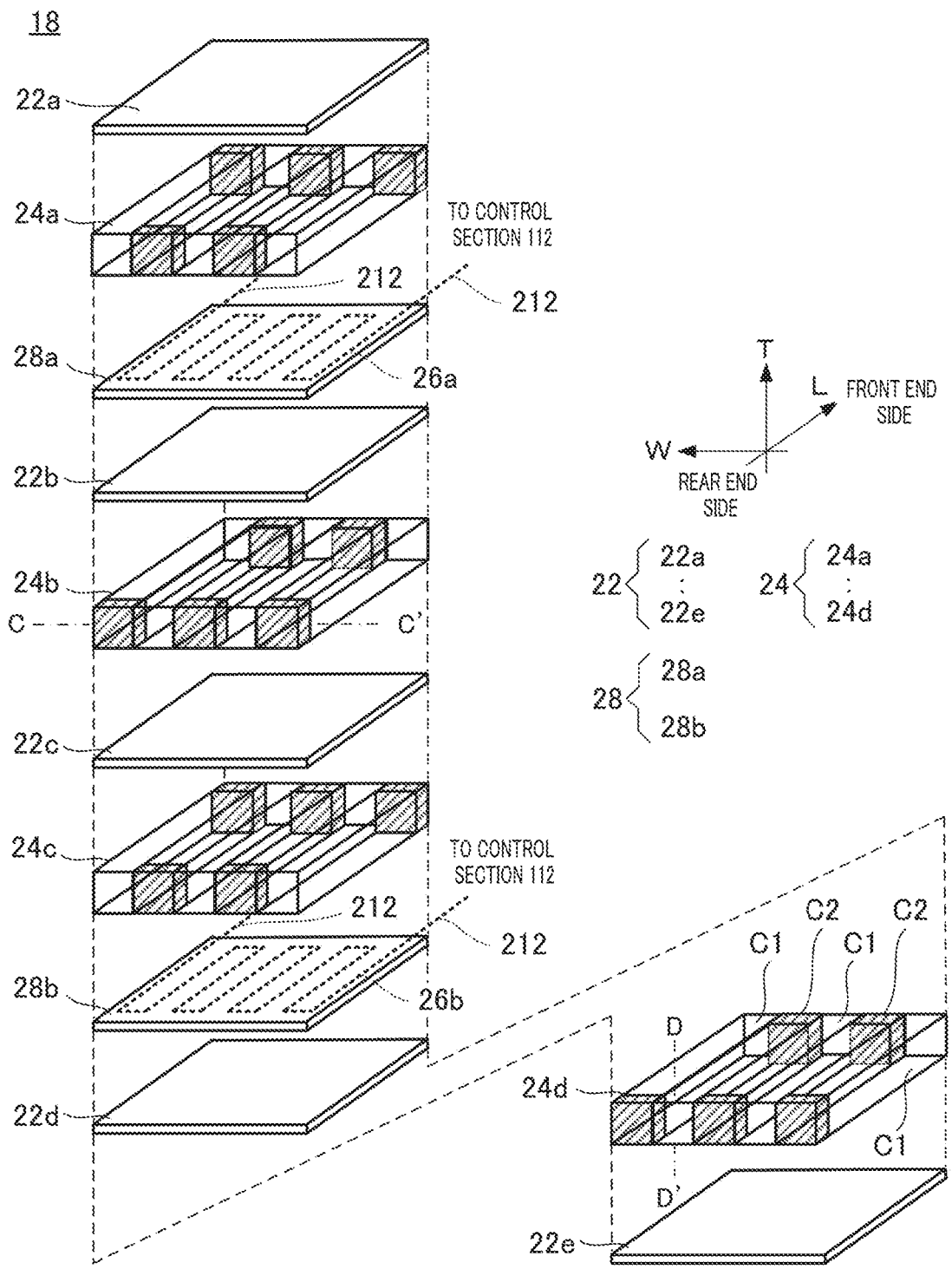
FIG. 3B is an exploded perspective view of the sensor section shown in FIG. 3A.
Figure 3C:
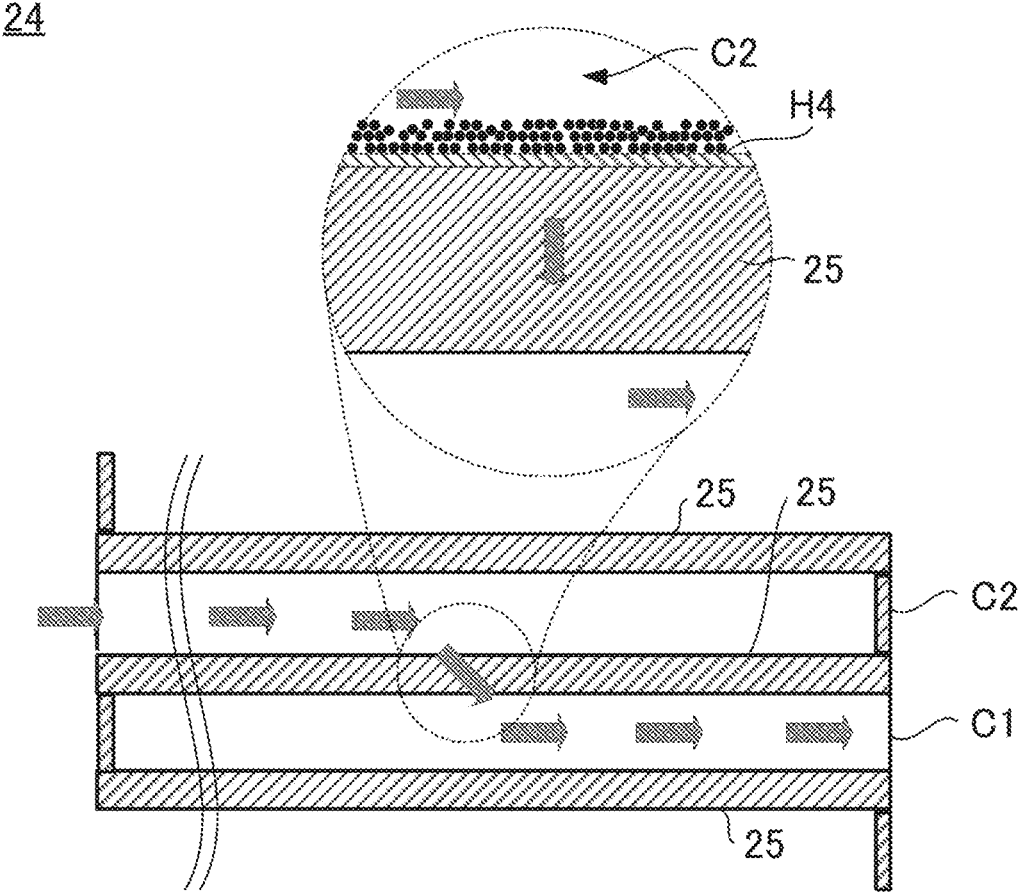
FIG. 3C is a cross-sectional view of the sensor section taken along line C-C' of FIG. 3B as seen along height direction T.

Note that in FIGS. 3A and 3B, the spaces between adjacent electrodes 22 are not partitioned along height direction T by porous members 24, but partitioned into a total of five cuboid cavities C1 and C2 along width direction W. In FIGS. 3A and 3B, the closed portions in cuboid cavities C1 and C2 are hatched.

In addition, in the present disclosure, four porous members 24a to 24d are aligned along height direction T. In this case, combinations of cuboid cavities C1 and C2 aligned adjacent to each other via electrode 22 along height direction T also have such a relationship. In other words, when the front end of first cuboid cavity C1 forms an opening and the rear end is closed, the front end of second cuboid cavity C2 aligned adjacent thereto along height direction T is closed and the rear end forms an opening.

Figure 3D:
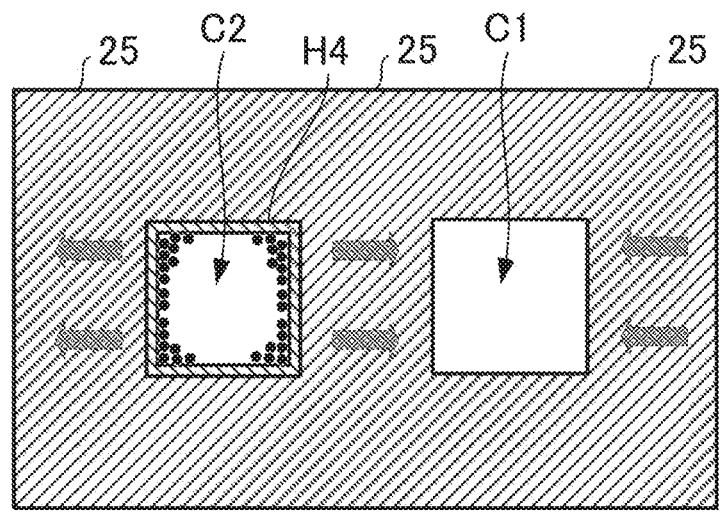
FIG. 3D is a plan view of a porous member, showing the cross-section of the sensor section taken along line D-D' of FIG. 3B as seen from the rear end side.
Figure 3D:
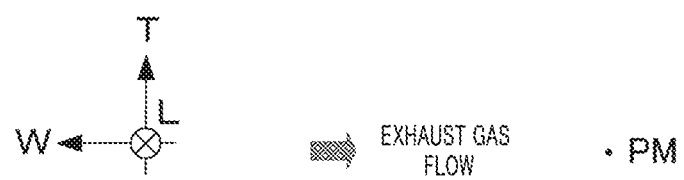

Further, in this PM sensor 1A, as shown in FIGS. 3C and 3D, the portion of each partition wall 25 which adjoins to corresponding second cuboid cavity C2 (i.e., the portion of each partition wall 25 which includes a surface) is provided with a membrane layer which is an example of accumulation section H4. In this description, accumulation section H4 is equivalent to a membrane layer and a membrane layer is therefore denoted by reference numeral H4.

Each membrane layer H4 is composed of metal oxide or metal composite oxide, specifically alumina or silica. Further, each membrane layer H4 is a heat-resistant and electrically insulating layer. Such membrane layers H4 each have a number of pores. The average pore diameter in membrane layer H4 is smaller than the average pore diameter in porous member 24 in the portion of each partition wall 25 (porous member 24) other than membrane layer H4 (hereinafter referred to as non-accumulation section). Further, in membrane layer H4, pores of substantially the same diameter preferably distribute uniformly and regularly. Furthermore, it is preferable that the porosity in the non-accumulation section be smaller than that in membrane layer H4.

Note that the average pore diameter of the pores in porous member 24 is designed to be larger than, for example, the average pore diameter in PM filter 206. In this case, membrane layer H4 is preferably a layer with pores having an average pore diameter smaller than the average pore diameter in porous member 24. To give a specific example, if PM filter 206 predominantly has pores with a diameter of several micrometers to several tens of micrometers, the average pore diameter in porous member 24 is preferably designed to be larger than several tens of micrometers and the average pore diameter in membrane layer H4 is preferably designed to be less than or equal to several tens of micrometers.

In addition, in this PM sensor 1A, membrane layer H4 is laminated on porous member 24. The reason why such a configuration is adopted is to ensure the strength of sensor section 18.

As shown in FIG. 3B, at least one heater 26 (in the drawing, heaters 26a and 26b) consists of a conductor trace embedded in insulating ceramic sheet 28 (in the drawing, ceramic sheets 28a and 28b) inserted between, for example, electrode 22 and porous member 24. To burn the PM present on the surface of or inside porous member 24, each heater 26 desirably consists of a conductor trace as narrow as possible meandering in ceramic sheet 28. Alternatively, at least one electrode 22 may have the function of heater 26.

Refer again to FIG. 2. In sensor section 18 with the above configuration, the side surfaces excluding at least opposite end surfaces in length direction T are surrounded by support member 110. Here, support member 110 consists of a heat-resistant fibrous mat. Sensor section 18 surrounded by support member 110 is contained in the internal space of inner case 14.

Further, a trace of conductor 210 is drawn out from each electrode 22 (see FIG. 3A), and a trace of conductor 212 is drawn out from each of the opposite ends of each heater 26 (see FIG. 3B). These conductors 210 and 212 are connected to control section 112.

Control section 112 is, for example, an electronic control unit (ECU) and includes sensor regeneration control section 32 and PM amount derivation section 34 as functional blocks. Each of functional blocks 32 and 34 is implemented by, for example, a microcomputer that executes a program.

Sensor regeneration control section 32 energizes each heater 26 in a predetermined timing (specifically, in accordance with the capacitance of each capacitor (i.e., two electrodes 22 in pairs)), and burns the PM accumulated in each porous member 24 (i.e., the sensor regeneration process).

PM amount derivation section 34 estimates the total amount of PM in the exhaust gas from internal combustion engine 100 according to the amount of change in the capacity during a predetermined period (e.g., from the end of the sensor regeneration process to the start of the next sensor regeneration).

The details of the sensor regeneration process and the estimation of the total amount of PM are omitted here because they are described in Japanese Patent Application Laid-Open No. 2016-008863 and the like.

3. OPERATION OF PM SENSOR 1A

In FIG. 1, the exhaust gas discharged from internal combustion engine 100 is processed by oxidation catalyst 204 and PM filter 206, and flows downstream in exhaust passage P. The exhaust gas that has passed through PM filter 206 is partially taken in PM sensor 1A. To be specific, as shown in FIG. 2, the exhaust gas passes between the cases 12 and 14 and flows from inlet Hin1 into inner case 14. Afterwards, as shown in FIGS. 3C and 3D, the exhaust gas flows into second cuboid cavity C2 from the opening on the rear end side of porous member 24. Here, in second cuboid cavity C2, the end of the exhaust gas passage located downstream is closed, so that the exhaust gas passes through partition wall 25 and flows into first cuboid cavity C1. In first cuboid cavity C1, the end of the exhaust gas passage located upstream is closed, so that the exhaust gas flows out from the opening at the front end thereof.

As described above, PM amount derivation section 34 estimates the total amount of PM in the exhaust gas from internal combustion engine 100, according to the amount of change in capacitance (specifically, the amount of change in a predetermined period) obtained from the capacitors (electrodes 22 in pairs) via conductor 210. Sensor regeneration control section 32 energizes each heater 26 at a predetermined timing via conductor 212 and burns the PM accumulated in each porous member 24.

4. MAIN FUNCTIONS AND EFFECTS OF PM SENSOR 1A

In porous member 24 of this PM sensor 1A, partition wall 25 is disposed such that the exhaust gas passage is blocked, thereby forming first cuboid cavity C1 and second cuboid cavity C2. Membrane layer H4 described above is formed on the surface of partition wall 25 adjacent to second cuboid cavity C2 (i.e., the surface of partition wall 25 located upstream of the exhaust gas passage). Accordingly, when the exhaust gas flows into the opening on the rear end side of second cuboid cavity C2, the exhaust gas itself passes through membrane layer H4 and partition wall 25 and flows into first cuboid cavity C1, but most of the PM contained in the exhaust gas accumulates on the surface of membrane layer H4.

For this reason, even if porous member 24 with nonuniform pore sizes and distribution is used in PM sensor 1A, since PM sensor 1A has membrane layer H4, PM barely accumulates in porous member 24. Hence, for this PM sensor 1A, there is no need to consider variations in the way that PM accumulates in porous member 24, and this PM sensor 1A can detect the capacitance of the capacitor without being affected by the PM in porous member 24.

5. OTHER FUNCTIONS AND EFFECTS OF PM SENSOR 1A

In addition, in the conventional PM sensor, which uses a porous filter, the problem arises that the accuracy of the detection results given by the PM sensor is affected in the state where there is no or a small amount of PM accumulated in the porous filter (that is, in the initial state). This problem will now be described in detail.

In this type of PM sensor, the accumulated PM is burned at a predetermined timing (the sensor regeneration process). Accordingly, the PM sensor enters the initial state every time the sensor regeneration process is performed. Hence, even the same porous filter exhibits different ways of accumulation of PM in the porous filter in each initial state.

In addition, when the PM sensor includes multiple porous filters, the PM on the multiple porous filters is burned together (that is, concurrently) in the sensor regeneration process. Accordingly, PM accumulates in the multiple porous filters in a different way in a certain initial state.

As described above, in the conventional PM filter, PM does not always accumulate in the same manner in the initial state and the accuracy of the detection results given by the PM sensor is therefore affected.

However, in PM sensor 1A, membrane layer H4 prevents PM from substantially remaining in porous member 24; thus, when PM sensor 1A is in the initial state, the accuracy of the detection results given by PM amount derivation section 34 (see FIG. 2) is barely affected.

Moreover, in PM sensor 1A, the average pore diameter in membrane layer H4 is smaller than that in partition wall 25, but the porosity in membrane layer H4 is larger than that in partition wall 25. Accordingly, even if membrane layer H4 is laminated on partition wall 25, the excessive pressure loss in this portion is prevented.

6. FIRST MODIFICATION

Figure 4:
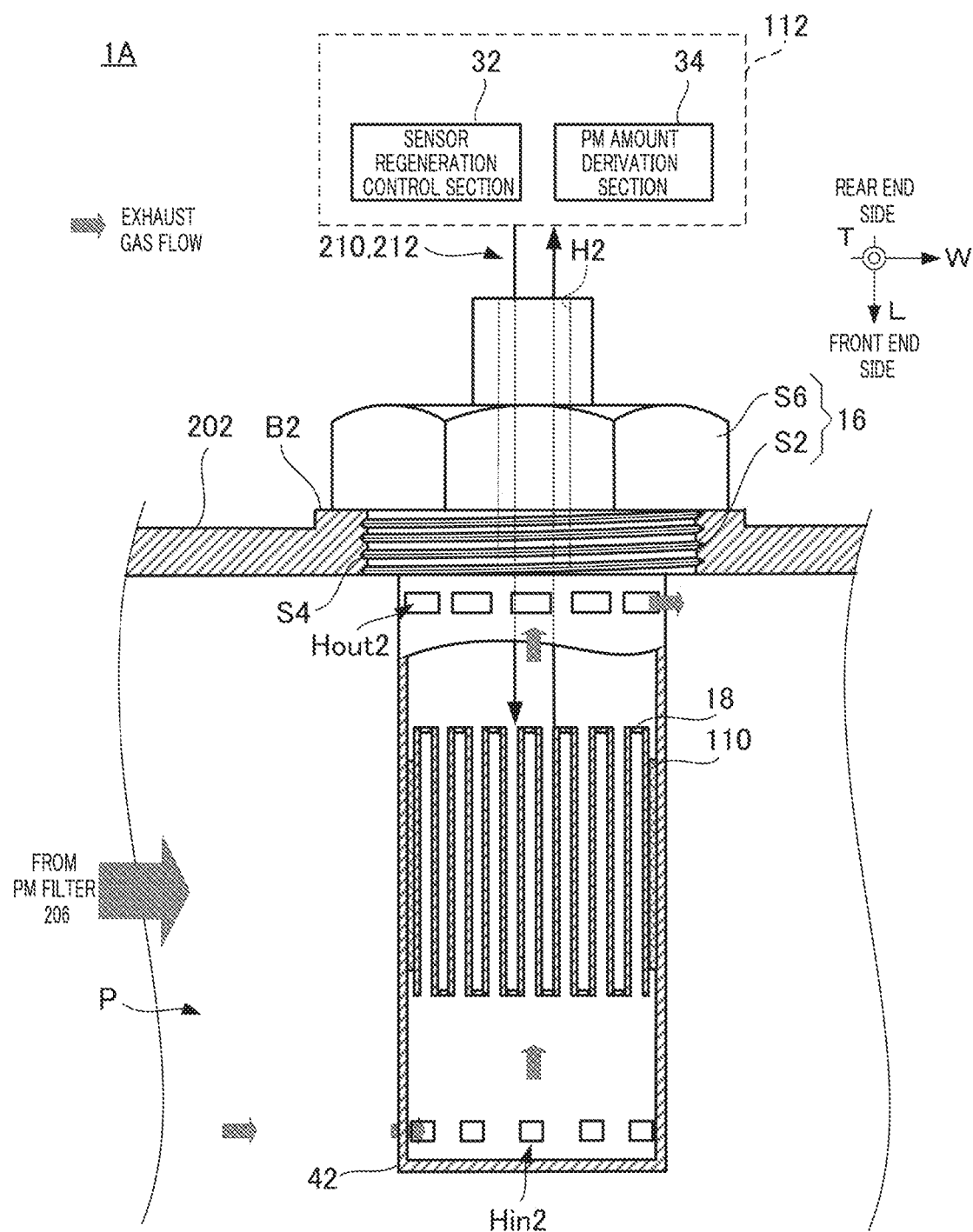
FIG. 4 is a partial cross-sectional view schematically showing a modification of the PM sensor shown in FIG. 2.

PM sensor 1A described above includes outer case 12 and inner case 14. However, this is not necessarily the case, and PM sensor 1A may include one single case 42 as shown in FIG. 4, instead of outer case 12 and inner case 14. There is no other difference between PM sensor 1A in FIG. 4 and that in FIG. 2. Therefore, in FIG. 4, those corresponding to the components shown in FIG. 2 are denoted by the same reference numerals as these components, and description thereof will be omitted.

Case 42 has, for example, a bottomed cylindrical shape having a center axis parallel to length direction L. The rear end of case 42 is not closed but forms an opening. Further, the front end of case 42 is bottomed and closed.

Further, in the vicinity of the front end of case 42, multiple inlets (through holes) Hin2 are formed along the circumferential direction of the outer surface of case 42. Further, in the vicinity of the rear end of case 42, multiple outlets (through holes) Hout2, which have a larger open area than inlets Hin2, are formed along the circumferential direction of the outer surface of case 42. Note that in FIG. 2, for visibility in the drawing, only one inlet and one outlet are given reference numerals Hin2 and Hout2.

Sensor section 18 surrounded by support member 110 is contained in the internal space of case 42. The details of case 42 described above are omitted here because they are described in Japanese Patent Application Laid-Open No. 2016-008863.

The case of PM sensor 1A may have various other shapes.

7. NOTE

In addition, in the above description, cavities C1 and C2 are described as being cuboid. However, this is not necessarily the case: cavities C1 and C2 may have any shape other than a cuboid shape.

Further, in the above description, membrane layer H4 described as an example of the accumulation section is laminated on the surface of the non-accumulation section of porous member 24. However, an accumulation section and a non-accumulation section may be formed on partition wall 25 through a method other than lamination (e.g., annealing using a volatile or foamed material). The accumulation section is a portion in partition wall 25 which includes the surface located upstream of the exhaust gas passage, and the non-accumulation section is a portion located downstream of the passage from the accumulation section.

Internal combustion engine 100 has been described as being a diesel engine. However, this is not necessarily the case: internal combustion engine 100 may be a gasoline engine.

8. CROSS REFERENCE TO RELATED APPLICATIONS

This application is based upon Japanese Patent Application No. 2016-081541, filed on Apr. 14, 2016; the entire contents of which are incorporated herein by reference.

INDUSTRIAL APPLICABILITY

A PM sensor of the present disclosure can suppress a reduction in the detection accuracy and is suitable for use in a vehicle including an internal combustion engine.

REFERENCE SIGNS LIST

1A PM sensor
22 Electrode
24 Porous member
H4 Membrane layer (accumulation section)

The invention claimed is:

1. A particulate matter (PM) sensor, comprising:
   a porous member including a partition wall disposed in a passage of an exhaust gas containing particulate matter;
   at least a pair of electrodes opposed to each other in a predetermined direction across the porous member; and
   an accumulation section provided in a surface on a upstream side of the passage of the partition wall, so that particulate matter accumulates on the surface, the accumulation section including pores with an average pore diameter smaller than an average pore diameter of a portion other than the accumulation section in the partition wall.

2. The PM sensor of claim 1, wherein
   a porosity of the accumulation section is higher in the partition wall than that of a portion other than the accumulation section.

3. The PM sensor of claim 1, wherein:
   the surface is parallel to the predetermined direction,
   the partition wall partitions a space between the pair of electrodes into a first cavity and a second cavity aligned in a direction orthogonal to the predetermined direction,
   an end of the first cavity located downstream forms an opening, and an end of the first cavity located upstream is closed, and
   an end of the second cavity located downstream is closed, and an end of the second cavity located upstream forms an opening.

* * * * *